United States Patent
Nitsche et al.

(10) Patent No.: US 10,823,931 B2
(45) Date of Patent: Nov. 3, 2020

(54) REAL-TIME PLUG TRACKING WITH FIBER OPTICS

(71) Applicant: Halliburton Energy Services, Inc., Houston, TX (US)

(72) Inventors: Wolfgang Hartmut Nitsche, Humble, TX (US); John Laureto Maida, Jr., Houston, TX (US); Christopher Lee Stokely, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/310,673

(22) PCT Filed: Jul. 28, 2016

(86) PCT No.: PCT/US2016/044483
§ 371 (c)(1),
(2) Date: Dec. 17, 2018

(87) PCT Pub. No.: WO2018/022063
PCT Pub. Date: Feb. 1, 2018

(65) Prior Publication Data
US 2019/0265430 A1    Aug. 29, 2019

(51) Int. Cl.
*E21B 47/00* (2012.01)
*E21B 33/13* (2006.01)
(Continued)

(52) U.S. Cl.
CPC .............. *G02B 6/502* (2013.01); *F16L 55/48* (2013.01); *F17D 3/00* (2013.01); *F17D 3/01* (2013.01); *F17D 5/00* (2013.01); *G02B 6/54* (2013.01)

(58) Field of Classification Search
CPC .... E21B 47/123; E21B 47/0905; E21B 33/16; E21B 47/09; E21B 47/0005; E21B 47/10;
(Continued)

(56) References Cited

U.S. PATENT DOCUMENTS 2,324,698 A * 7/1943 Hart ........................ E21B 47/04
                                                              33/715
3,426,204 A * 2/1969 Sutton ................... E21B 47/053
                                                              250/260
(Continued)

FOREIGN PATENT DOCUMENTS

CA          1161115 A       1/1984
WO       2010/020781 A1     2/2010
(Continued)

OTHER PUBLICATIONS

International Search Report and Written Opinion issued in Related PCT Application No. PCT/US2016/044483 dated Jan. 17, 2017, 9 pages.
(Continued)

*Primary Examiner* — Edwin J Toledo-Duran
(74) *Attorney, Agent, or Firm* — Thomas Rooney; Baker Botts L.L.P.

(57) ABSTRACT

A plug may be deployed within a pipeline along with a fluid. The plug is coupled to a fiber optic line dispensed from fiber optic dispenser located outside or within the pipeline. The plug may transmit a signal via the fiber optic line that is indicative of the location of the plug within the pipeline. The signal may comprise light pulses associated with the traversal of a pipeline joint by the plug. The location may allow the plug to be reclaimed efficiently and economically should the plug become lodged within the pipeline. The plug may communicate other measurement information via the fiber
(Continued)

optic line and this information may be used to adjust operational parameters associated with the pipeline.

20 Claims, 3 Drawing Sheets

(51) Int. Cl.

| | | |
|---|---|---|
| *G01V 8/02* | (2006.01) | |
| *E21B 33/16* | (2006.01) | |
| *E21B 47/10* | (2012.01) | |
| *G02B 6/50* | (2006.01) | |
| *F16L 55/48* | (2006.01) | |
| *F17D 3/01* | (2006.01) | |
| *F17D 5/00* | (2006.01) | |
| *G02B 6/54* | (2006.01) | |
| *F17D 3/00* | (2006.01) | |

(58) Field of Classification Search
CPC ........ E21B 47/002; E21B 33/13; E21B 47/00;
E21B 47/04; E21B 47/0006; E21B 47/12;
G01V 8/02
USPC ............ 166/250.01, 254.2, 255.1, 65.1, 66.1
See application file for complete search history.

(56) References Cited

U.S. PATENT DOCUMENTS

| | | | | |
|---|---|---|---|---|
| 3,541,341 | A * | 11/1970 | Leete ................... | H04B 10/032 250/227.11 |
| 3,837,214 | A * | 9/1974 | Guest ................... | F16L 55/1283 73/40.5 R |
| 4,430,613 | A | 2/1984 | French | |
| 4,756,510 | A | 7/1988 | Klamm et al. | |
| 4,907,314 | A * | 3/1990 | Kershaw ............... | B08B 9/0557 15/104.061 |
| 5,036,916 | A * | 8/1991 | Bennett ................. | E21B 47/005 166/253.1 |
| 5,138,153 | A * | 8/1992 | Gergely ................ | G01M 3/047 250/227.18 |
| 5,565,633 | A * | 10/1996 | Wernicke ............... | G01N 27/82 324/220 |
| 6,561,488 | B1 | 5/2003 | Walker | |
| 6,766,703 | B1 * | 7/2004 | Kluth ................... | E21B 47/017 73/866.5 |
| 7,222,549 | B2 | 5/2007 | Abney | |
| 8,573,313 | B2 * | 11/2013 | Lovell ................... | E21B 33/072 166/385 |
| 8,636,063 | B2 * | 1/2014 | Ravi ...................... | E21B 33/14 166/253.1 |
| 8,826,979 | B2 * | 9/2014 | James ................... | E21B 33/13 166/250.14 |
| 9,127,531 | B2 * | 9/2015 | Maida ................... | E21B 47/092 |
| 9,347,882 | B2 * | 5/2016 | Atzler ................... | G01N 21/645 |
| 10,261,243 | B2 * | 4/2019 | LeBlanc ................ | E21B 47/113 |
| 10,302,796 | B2 * | 5/2019 | Wilson ................... | E21B 43/16 |
| 2002/0075114 | A1 * | 6/2002 | Hall ....................... | F16L 15/001 336/192 |
| 2004/0017569 | A1 * | 1/2004 | Payne ................... | G01N 21/05 356/436 |
| 2004/0060697 | A1 * | 4/2004 | Tilton ................... | E21B 47/09 166/253.1 |
| 2004/0134662 | A1 * | 7/2004 | Chitwood .............. | E21B 7/04 166/367 |
| 2004/0211443 | A1 * | 10/2004 | Latiolais, Jr. ........... | F16L 55/48 134/8 |
| 2004/0227509 | A1 * | 11/2004 | Ucan ..................... | G01V 15/00 324/220 |
| 2005/0274511 | A1 * | 12/2005 | Collins ................. | E21B 23/02 166/254.2 |
| 2005/0274518 | A1 * | 12/2005 | Collins ................. | E21B 47/01 166/285 |
| 2005/0281510 | A1 * | 12/2005 | Vo ......................... | G02B 6/3887 385/60 |
| 2006/0107773 | A1 * | 5/2006 | Abney ................... | F16L 55/48 73/865.9 |
| 2006/0157239 | A1 * | 7/2006 | Ramos ................... | E21B 47/10 166/254.2 |
| 2006/0165344 | A1 * | 7/2006 | Mendez ................ | G01L 11/025 385/13 |
| 2008/0255706 | A1 * | 10/2008 | Aleksandersen ... | F16L 55/1283 700/275 |
| 2008/0272931 | A1 * | 11/2008 | Auzerais ............... | E21B 47/135 340/854.7 |
| 2009/0013806 | A1 * | 1/2009 | Miller ................... | F16L 55/48 73/865.8 |
| 2009/0090512 | A1 | 4/2009 | Zupanick | |
| 2009/0188059 | A1 * | 7/2009 | Albrecht ................ | F16L 55/40 15/104.061 |
| 2009/0219171 | A1 * | 9/2009 | Vigneaux ............... | G01B 11/14 340/854.1 |
| 2010/0132737 | A1 * | 6/2010 | Mousa .................. | B08B 9/0553 134/8 |
| 2010/0309750 | A1 | 12/2010 | Brady | |
| 2011/0090496 | A1 * | 4/2011 | Samson ................. | E21B 47/07 356/301 |
| 2011/0139538 | A1 * | 6/2011 | Hill ....................... | G01P 3/14 181/123 |
| 2012/0000650 | A1 * | 1/2012 | James ................... | E21B 33/13 166/250.14 |
| 2012/0085538 | A1 * | 4/2012 | Guerrero ................ | E21B 43/14 166/284 |
| 2012/0118567 | A1 * | 5/2012 | Cooke, Jr. ............. | E21B 33/05 166/286 |
| 2012/0241173 | A1 * | 9/2012 | Hales ................... | E21B 47/017 166/382 |
| 2012/0298243 | A1 | 11/2012 | Zierolf | |
| 2013/0056197 | A1 * | 3/2013 | Maida ................... | E21B 47/092 166/250.01 |
| 2013/0056202 | A1 * | 3/2013 | Maida ................... | E21B 47/092 166/255.1 |
| 2013/0249705 | A1 * | 9/2013 | Sharp ................... | E21B 47/092 340/854.7 |
| 2013/0267120 | A1 * | 10/2013 | Rothkopf ............ | H01R 13/6683 439/620.21 |
| 2013/0268357 | A1 * | 10/2013 | Heath ................... | G06Q 30/02 705/14.53 |
| 2013/0292127 | A1 * | 11/2013 | Fenton ................. | E21B 33/043 166/339 |
| 2014/0034301 | A1 * | 2/2014 | Leblanc ................ | E21B 47/005 166/250.14 |
| 2014/0123759 | A1 * | 5/2014 | Minto ................... | F17D 5/005 73/592 |
| 2015/0010356 | A1 * | 1/2015 | Adler ..................... | G01M 3/18 405/52 |
| 2015/0226055 | A1 | 8/2015 | Ringgenberg et al. | |
| 2015/0237460 | A1 * | 8/2015 | Goyal ................... | G01D 11/00 455/41.2 |
| 2015/0237461 | A1 * | 8/2015 | Goyal ................... | H01Q 1/40 455/41.2 |
| 2017/0268714 | A1 * | 9/2017 | Giron ................... | F16L 55/48 |
| 2018/0180766 | A1 * | 6/2018 | Therrien ............... | E21B 47/135 |
| 2018/0245424 | A1 * | 8/2018 | Stokley ................. | E21B 33/16 |

FOREIGN PATENT DOCUMENTS

| | | |
|---|---|---|
| WO | 2014/031116 A1 | 2/2014 |
| WO | 2014/095581 A1 | 6/2014 |
| WO | 2016/186612 A1 | 11/2016 |

OTHER PUBLICATIONS

The Fiber Optic Association, Inc., "Reference Guide to Fiber Optics—Installing Fiber Optic Cable—"Figure 8 Cable"", found at http://www.thefoa.org/tech/ref/install/figure8.html, 4 pages.
OptaSense—a QinetiQ Company Brochure, "Fiber Optic Pipeline

(56) References Cited

OTHER PUBLICATIONS

Monitoring System—Preventing and detecting leaks in real time", 2016, 8 pages.
StarTrak Pigging Technologies, "StarTrak Pigging Presents the Magnetic Attraction: A Piggy Primer" found at http://www.starpig.com/PDF/Full Brochure.pdf, 9 pages.
Tracerco, "Tracerco Diagnostics—Pig Tracking Services During Repair of 24" Pipeline" found at http://www.tracerco.com/case-studies/repair-of-pipeline, 2 pages.

* cited by examiner

REAL-TIME PLUG TRACKING WITH FIBER OPTICS

CROSS-REFERENCE TO RELATED APPLICATION

The present application is a U.S. National Stage Application of International Application No. PCT/US2016/044483 filed Jul. 28, 2016, which is incorporated herein by reference in its entirety for all purposes.

BACKGROUND

The present disclosure relates generally to systems and methods for pipeline and process services, and more specifically (although not necessarily exclusively), to systems and methods for tracking the location of a plug in a pipeline.

Many applications associated with pipelines require that the pipelines be "pigged". For example, in the development of subterranean or subsea oil and/or gas fields flowlines or pipelines must be "pigged" at least in some location between the well and the host facility. A "pig", pipeline robot, dart or pipeline inspection gauge (all generically referred to as "plugs") describe any of a variety of objects with sealing discs or full bore devices that are moved through a pipeline. Some types of plugs, for example, "intelligent pigs", may include a long train of modules that incorporate sensors to measure any number of pipeline parameters, for example, pipe wall thickness, joint weld integrity, locations, etc.

During the precommissioning of a pipeline, a fluid (for example, filtered seawater) is often injected into a pipeline to ensure it is completely filled to enable a hydrostatic pressure testing. Following the completion of a hydrostatic testing operation on the pipeline, it may be necessary to execute a dewatering operation to remove any water from the subsea pipeline before the production fluid (for example, oil or gas) is allowed to flow through the pipeline.

In some applications, a plug may become lodged within the pipeline and is unable to proceed through the pipeline. The plug then creates a blockage within the pipeline. Typically, the exact location of the plug is unknown making it difficult to locate and remove the blockage. Removal of a plug lodged within a pipeline in remote subterranean pipelines or subsea pipelines may be especially difficult and expensive to locate and remove. When a plug becomes lodged, a search for the stuck plug typically requires disassembling various sections of the pipeline. The location to begin the search may be decided in a random fashion or based on an estimate of the plug location. Such methods of location and removing a stuck plug are expensive and time consuming.

DETAILED DESCRIPTION

Figure 1:
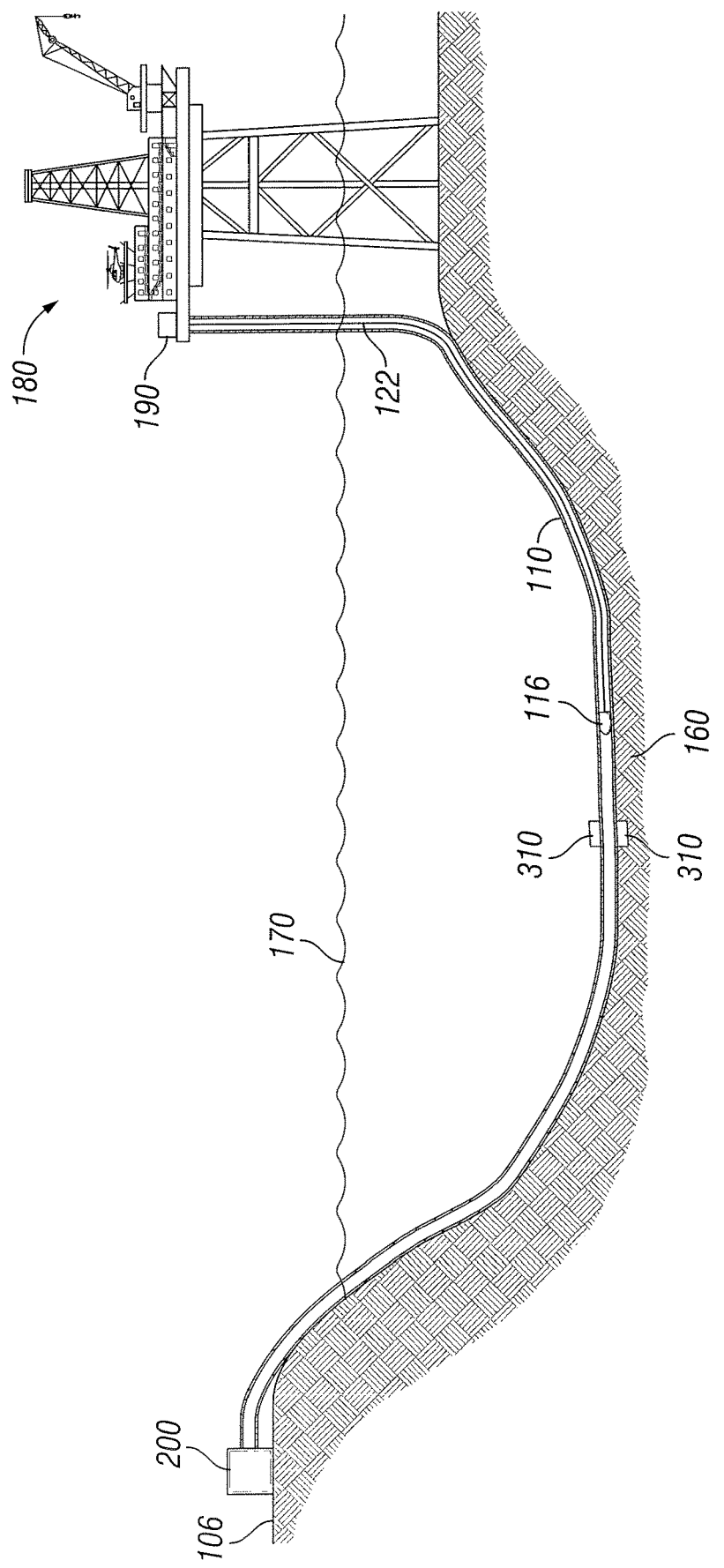
FIG. 1 is a diagram of a subsea pipeline with a deployed plug attached to a fiber optic line, according to an aspect of the present disclosure.

The present disclosure relates generally to pipeline and process services and, more particularly, to using a fiber optically connected plug to traverse a pipeline, for example, a subterranean or subsea pipeline.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to various pipeline services that include but are not limited to deploying a plug in any type of subterranean or subsea pipeline. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or local area network (LAN). Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Certain aspects and features of the present disclosure relate to a system for tracking the location or position within a pipeline of a plug during deployment in a pipeline using fiber optic telemetry. Deploying the plug with an attached fiber optic line allows for real time tracking of the plug within the pipeline so that accurate plug location information may be obtained. Also, one or more control signals may be transmitted to the plug from an information handling system located at the surface. In one embodiment, for example, one or more control signals may switch power to an X-ray machine of the plug so an inspection may be performed at a specified location. In one embodiment, a control signal may activate any known device or tool of the plug to perform a suitable measurement or inspection of the pipeline.

FIG. 1 illustrates a deployed plug within a subsea pipeline where the plug is attached to a fiber optic line, according to an aspect of the present disclosure. A plug 116 is deployed within a pipeline 110 below sea level 170. Pipeline 110 may contain a fluid including, but not limited to, a hydrocarbon, water, mud, or any other type of fluid for a given operation. Pipeline 110 may be located on the seabed 160 or below the seabed 160. In one or more embodiments, plug 116 may be launched from a plug launch 190 located at a floating or production platform 180. Plug 116 is coupled to a fiber optic line 122. As the plug 116 traverses the pipeline 110, the plug launch 190 allows fiber optic line 122 to be dispensed, for example, dispensed from a fiber optic dispenser, for example, a spool, a reel, a bobbin, or any other appropriate device, within plug launch 190. Plug 116 may be ejected from the pipeline at a landing tunnel or ejector 200 located at a surface 106. In other embodiments, plug 116 may be ejected at an ejector 200 located at another floating or production platform or production facility. In other embodiments, plug 116 may be launched from any suitable platform that supports a plug launch 190 or in any other suitable manner. In one or more embodiments, the plug 116 may flow through the pipeline 110 at the same velocity as the fluid being injected into the pipeline 110 or released based on a tension of the fiber optic line 122. In one or more embodiments, one or more tags 310 may be located along the pipeline 110. For example, the tags 310 may comprise a radio frequency identification ("RFID") tag, a sensor, or any other device that may be used to indicate a location.

Figure 2:
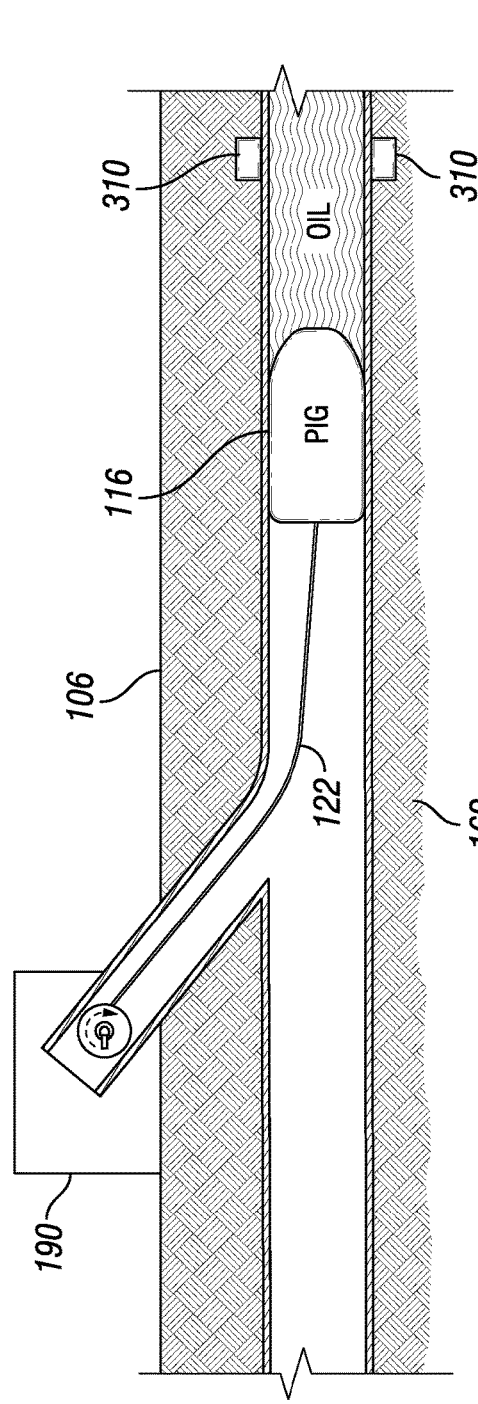
FIG. 2 is a diagram of a subterranean pipeline with a deployed plug attached to a fiber optic line, according to an aspect of the present disclosure.

FIG. 2 illustrates a subterranean pipeline with a deployed plug attached to a fiber optic line, according to an aspect of the present disclosure. A plug 116 is deployed in a subterranean pipeline 110 within a subterranean location 162. The plug 116 may be launched from a plug launch 190 located at the surface 106. The plug 116 is coupled to a fiber optic line 122 which may be dispensed from a fiber optic dispenser, for example, a spool, bobbin, reel, or any other appropriate device, within the plug launch 190. An ejector 200 (as shown in FIG. 1) may be located at the surface 106 so that the plug 116 may be reclaimed. One or more RFID tags may be located along the pipeline 110.

Figure 3:
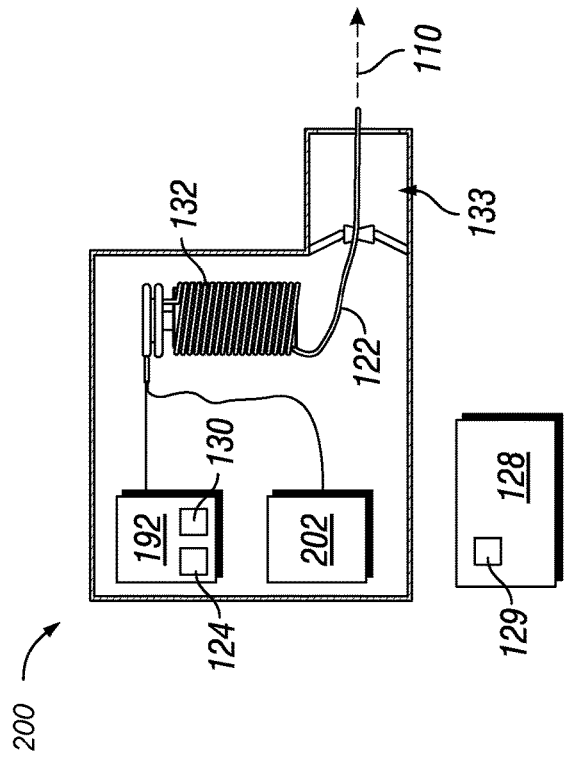
FIG. 3 is a diagram of a plug system, according to an aspect of the present disclosure.

FIG. 3 illustrates a plug system for deploying a fiber optic line coupled to a plug within a pipeline. A plug launch 190 may be located at a surface as illustrated in FIG. 1 or may be located within a pipeline 110 as illustrated in FIG. 2. The plug launch 190 may comprise one or more components for launching the plug 116. An optical integrator 192 may comprise a receiver 124 and a communication interface 130. The optical integrator 192 may couple to the fiber optic line 122 so as to receive, transmit and process information associated with the fiber optic line 122. The receiver 124 may be communicatively coupled to a communication interface 129 of information handling system 128. In one or more embodiments an information handling system 128 may be located within the plug launch 190. The communication interface 130 and the communication interface 129 may allow for any type of communication using any type of suitable protocol. The communication interface 130 and the communication interface 129 may include wireless interfaces such as IEEE 802.11, Bluetooth, or radio interfaces for accessing cellular telephone networks (e.g., transceiver/antenna for accessing a CDMA, GSM, UMTS, or other mobile communications network). Communication interface 130 and communication interface 129 may include interfaces such as Ethernet, USB, IEEE 1394, or a fiber optic interface. The receiver 124 may transmit information related to a fiber optic signal of fiber optic line 122. For example, the receiver 124 may transmit a light pulse count, a light pulse arrival time, or any other type of information associated with a fiber optic signal of fiber optic line 122. Receiver 124 may communicate or receive information from the information handling system 128 via the communication interface 130 communicatively coupled to the communication interface 129. The receiver 124 may be a photodetector. In one or more embodiments, the receiver 124 may count the number of light pulses received which are generated whenever the plug traverses a joint of the pipeline 110.

The light source 202 may be coupled to the optical integrator 192 and the fiber optic line 122. The light source 202 may be a laser, such as a high repetition pulse laser, or any other suitable light source. The light source 202 may generate an optical signal as a series of light pulses that are transmitted by the fiber optic line 122. The light source 202 may be controlled by the optical integrator 192 such that light is emitted from the light source 202 only when a command has been received to activate the light source 202 from the optical integrator 192. The optical integrator 192 may receive one or more commands to activate the light source 202 from the information handling system 128. In one or more embodiments, the light source 202 is controlled by a user interface located at the plug launch 190 or located remotely (for example, at information handling system 128).

A fiber optic dispenser 132 may dispense the fiber optic line 122 as the plug 116 is forced through the pipeline 110. In one or more embodiments, the fiber optic dispenser 132 comprises at least one of a reel or a bobbin. In one or more embodiments, the fiber optic dispenser 132 is a reel where the reel comprises or is coupled to a fiber optic rotary joint.

The fiber optic rotary joint may couple the fiber optic line 122 of the reel to a stationary fiber optic line of the optical integrator 192 to prevent the fiber optic line 122 from breaking or otherwise becoming damaged as the fiber optic line 122 is dispensed. In one or more embodiments, no fiber optic rotary joint is needed as the fiber optic dispenser 132 comprises the optical integrator 192 and any other necessary components. In one or more embodiments, the fiber optic dispenser 132 is a bobbin. A bobbin does not require a fiber optic rotary joint as the bobbin does not rotate as the fiber optic line 122 is released. In one or more embodiments, the fiber optic line 122 may be dispensed based, at least in part, on a tension in the fiber optic line 122. In one or more embodiments, the fiber optic line 122 may be dispensed or spooled off at the same rate as the flow of the displacement of a fluid in the pipeline 110. In one or more embodiments the pig launch 190 may be filled with compressed gas so that the fiber optic dispenser 132 is not immersed within the pipeline fluid and thus at the point of release, the fiber optic line 122 is dry.

The fiber optic line 122 may be fed to a pipeline 110 via an injection port 133. The fiber optic line 122 may be unarmored fiber that may include a fiber core and a cladding but no outer buffer or armored fiber that may include a fiber core, a cladding and an outer buffer. In one or more embodiments, fiber optic line 122 is a fiber optic cable. Fiber optic line 122 may be a multi-mode or single-mode optical fiber. The fiber optic line 122 may include a thin glass fiber core and an outer coating of plastic. The fiber optic line 122 may include one or more optical fibers. In one or more embodiments, the fiber optic line 122 may be a sacrificial cable that is not retrieved from the pipeline 110. The fiber optic line 122 may remain in the pipeline 110 until it is self-dissolved, destroyed, flushed out, or dispensed in any other way known to one of ordinary skill in the art.

Figure 4:
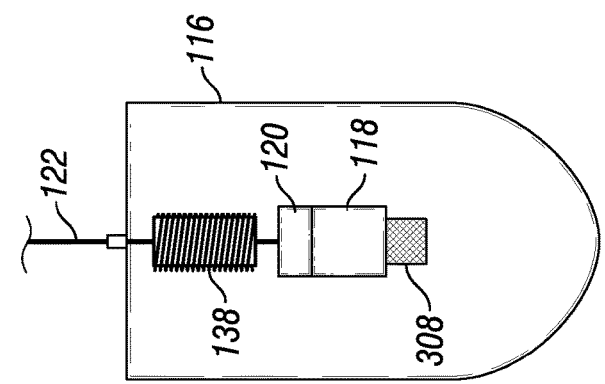
FIG. 4 is a diagram of a plug, according to an aspect of the present disclosure.

FIG. 4 illustrates a plug according to an aspect of the present disclosure. One end of the fiber optic line 122 is attached to the plug 116 while the other end is attached to a fiber optic dispenser, such as a reel, 132. In one or more embodiments, a lower fiber optic dispenser 138, for example, a lower bobbin or a lower reel is coupled to the plug 116. The fiber optic line 122 may be dispensed from a spool of the lower fiber optic dispenser 138 which may be positioned proximate to a magnetic pickup coil 118. The lower fiber optic dispenser 138 may include a drag device (not shown) that allows the lower fiber optic dispenser 138 to dispense the fiber optic line 122 only when a pre-set tension in the fiber optic line 122 is reached. The lower fiber optic dispenser 138 may prevent the fiber optic line 122 from breaking or otherwise becoming damaged as the fiber optic line 122 and the plug 116 travel through the pipeline 110. In one or more embodiments lower fiber optic dispenser 138 may operate in conjunction with a fiber optic rotary joint or reel or may be a bobbin as discussed above. Other embodiments may not include a lower fiber optic dispenser 138 or a magnetic pickup coil 118.

In one or more embodiments the plug 116 may include an RFID reader 308 for obtaining information from one or more RFID tags 310. A light emitting diode (LED) 120 may be coupled to the magnetic pickup coil 118. The magnetic pickup coil 118 may momentarily energize the LED 120 to generate a pulse of light in response to the voltage generated by the magnetic pickup coil 118. The LED 120 may transmit a pulse of light to a receiver 124 or directly to communication interface 129. In one or more embodiments, the LED 120 may be biased with energy from a battery or other energy source. The biased drive circuit of the LED 120 may require that less voltage be induced in the magnetic pickup coil 118 to complete the circuit and generate the pulse of light. The biased drive circuit of the LED 120 may allow small changes in the magnetic field sensed by the magnetic pickup coil 118 to generate a sufficient voltage to energize the LED 120. In one or more embodiments, the biased drive circuit of the LED 120 may allow the magnetic pickup coil 118 as it traverses a pipeline joint at a low velocity to generate enough voltage to complete the circuit of the LED 120 and emit a pulse of light. In one or more embodiments, a light source 202 may be positioned (for example, as illustrated in FIG. 3) such that an optical signal is communicated to the plug 116 within the pipeline 110 to determine a location of a pipeline joint.

The pipeline 110 may include one or more joints. The plug 116 may be deployed within the pipeline 110. In one or more embodiments, the plug 116 may comprise a magnet that creates a magnetic field that moves with the plug 116. In one or more embodiments, the plug 116 may be coupled to a magnetic pickup coil 118 that can detect a disturbance or change in a magnetic field or how the magnetic field interacts with the pipeline joints. For example, the magnetic field surrounding magnetic pickup coil 118 may be disturbed when the plug 116 passes a pipeline joint. The change in the magnetic field may induce a voltage in the magnetic pickup coil 118. The magnetic pickup coil 118 may be coupled to a light source, for example an LED 120. The voltage generated by the magnetic pickup coil 118 may briefly energize the LED 120 and cause the LED 120 to emit a pulse of light. The LED may be coupled to a fiber optic line 122 that extends to a pig launch 190 or may be communicatively coupled to an information handling system 128. In one or more embodiments, the magnetic pickup coil may generate an electric field that is detected.

In one or more embodiments, additional sensors may be coupled to the fiber optic line for monitoring various conditions within the pipeline 110. An additional sensor may include, but is not limited to, a temperature sensor, an acoustic sensor, a pressure sensor, a chemical sensor, an accelerometer, or other sensors for monitoring a condition within the pipeline 110. These sensors can transmit information about the pipeline conditions to the surface 106 via the fiber optic line 122.

While FIG. 4 illustrates components or elements in a certain location and order, the present disclosure contemplates any location or order suitable for a given operation. In one or more embodiments, any component or element of FIG. 4 may be located within the plug 116, outside the plug 116, or any combination thereof.

Figure 5:
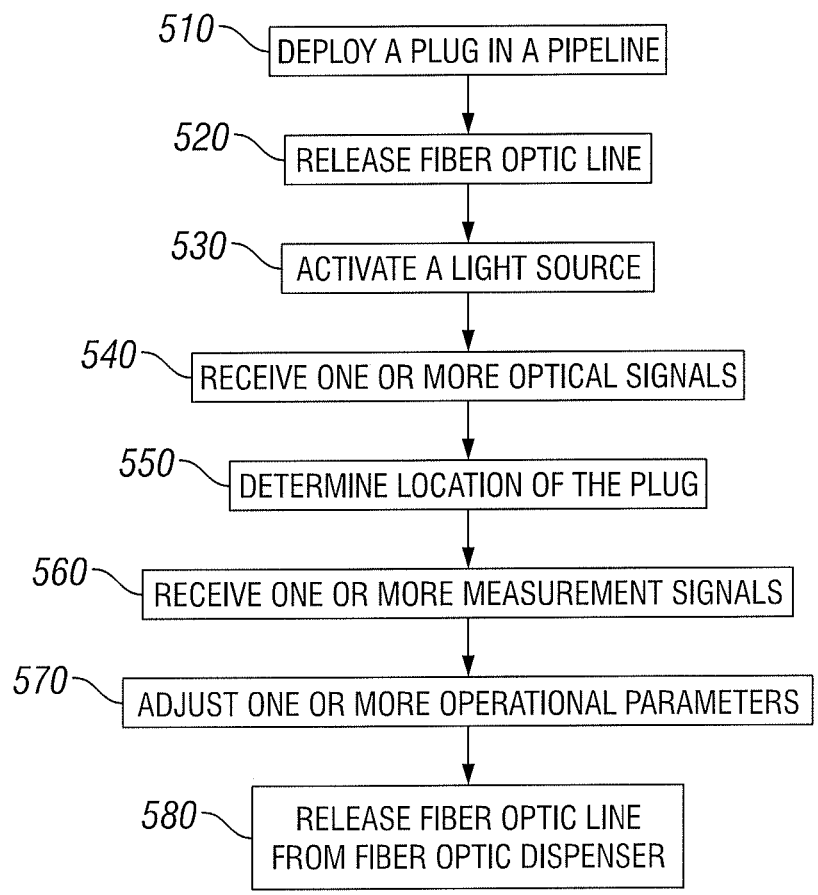
FIG. 5 is a flowchart of a method for deploying a fiber optically coupled plug in a pipeline.

FIG. 5 is a flowchart of a method for deploying a fiber optically coupled plug in a pipeline. At step 510, a plug 116 is deployed within a pipeline 110 from a pig launch 190. In one or more embodiments, the pipeline 110 may be at any location at a surface 106, within a subterranean location 162 or subsea in or along a seabed 160. The plug 116 is coupled to a fiber optic line 122. At step 520, the fiber optic line 122 is released or spooled from a fiber optic dispenser 132. The fiber optic line 122 may also be tethered at the pig launch 190 and spooled from a lower fiber optic dispenser 138. In other embodiments, the fiber optic line 122 may be spooled by any combination of the fiber optic dispenser 132 and the lower fiber optic dispenser 138. The fiber optic line 122 is released at rate to prevent tangling of the fiber optic line 122. In one embodiment, the fiber optic line is released at a faster rate than the velocity of the fluid in the pipeline to prevent the fiber optic line from being strained or damaged. In one or more embodiments, the fiber optic line may be released at a rate based, at least in part, on predetermined threshold rate where the threshold rate is a specified rate greater than the velocity of the fluid in the pipeline. For example, the threshold rate may be set to 1 meter/second (m/s). If the velocity of the fluid in the pipeline is 5 m/s, then based on the threshold rate the rate of releasing or dispensing the fiber optic line may be set to 6 m/s. In one or more embodiments, the fiber optic line 122 is released according to tension of the fiber optic line 122.

At step 530, a light source 202 is activated. The light source 202 may be activated at any one or more time intervals, may be activated such that a light is constantly emitted for a duration of an operation or deployment of a plug 116, or may be activated based on any other factor, condition or parameter according to a specific operation. The light source 202 may be activated according to one or more commands received from optical integrator 192, from information handling system 128 or any combination thereof. At step 540, one or more optical signals are received by a receiver 124 from the plug 116. The one or more optical signals may convey information indicative of or associated with the location of the plug 116 within the pipeline 110.

At step 550, the location of the plug 116 is determined based, at least in part, on the information received from the plug 116. For example, the receiver 124 may be a photodetector that converts the optical signal received from the plug 116 into an electrical signal that is conveyed to an information handling system 128. The information handling system may determine from the conveyed information how many joints of the pipeline 110 the plug 116 has traversed. The length of pipe between each joint may be known or predetermined. The location of the plug 116 may then be determined by multiplying the number of joints traversed by the length of the pipe. The joints may be identified by the plug utilizing a magnetic pickup coil 118.

The location of the plug 116 may be used to determine that the plug is lodged in the pipeline 110. For example, the location may indicate that the plug 116 has not traversed any other pipeline joints since the last signal from the plug 116 was received. In one or more embodiments, it may be known that the plug 116 is lodged and the location information is used to retrieve the plug 116 efficiently and economically. In one or more embodiments, if it is determined that the plug 116 is lodged, a notification is sent by any one or more comments (for example, the plug 116, the receiver 124, the information handling system 128, the optical integrator 192, or any other component known to one of ordinary skill in the art). In one or more embodiments, the notification or the location of the plug 116 or any combination thereof is displayed, for example, by the information handling system 128.

At step 560, one or more measurement signals are received from the plug 116. The measurement signals may convey any type of information including, but not limited to, high bandwidth ultrasound and X-ray images. The one or more measurement signals may be received by receiver 124 which transmits one or more measurement values associated with the measurement signals to the communication interface 129 of the information handling system 128. The one or more measurement signals may indicate a condition or that a problem has occurred with the pipeline 110. The condition or problem may trigger an alert which may be displayed by the information handling system 128. In response to one or more conditions or a determination of a problem, one or more measurement devices coupled to the plug 116 or the fiber optic line 122 may be activated. In one or more embodiments, any signals or communications from the plug 116 may be received directly by the information handling system 128, for example, by communication interface 129 of information handling system 128.

At step 570, one or more operational parameters may be adjusted based, at least in part, on the received one or more measurement signals. The one or more measurement signals may include, but not limited to, a temperature, an acoustical reading, a pressure, a chemical, a force (such as an acceleration force or pressure), duration, length of dispensed fiber optic line 122, a location, speed, velocity, or any other operational parameter known to one of ordinary skill in the art. For example, the flow rate of fluid in the pipeline may be increased or decreased based, at least in part, on the received one or more measurement signals. At step 580, the fiber optic line 122 may be released from the fiber optic dispenser 132.

Additional methods for monitoring the location of the plug 116 may also be utilized in conjunction with the systems and methods described herein.

In one or more embodiments a system comprises a plug deployed within a pipeline, a fiber optic line is coupled to the plug, a light source is coupled to the fiber optic line, wherein the light source provides a light for transmission through the fiber optic line, a receiver is coupled to the fiber optic line, a magnetic pickup coil is coupled to the plug, wherein the magnetic pickup coil generates a signal in response to detecting a change in a surrounding magnetic field, a fiber optic dispenser coupled to the fiber optic line, wherein the fiber optic dispenser dispenses the fiber optic line from an end of the fiber optic line, and an information handling system communicatively is coupled to the receiver, wherein the information handling system displays a location of the plug based, at least in part, on the signal.

In one or more embodiments, the fiber optic dispenser comprises a reel, and wherein the reel couples to a fiber optic rotary joint. In one or more embodiments, the system further comprises at least one of a lower bobbin or a lower reel coupled to the plug. In one or more embodiments, the system further comprises a radio frequency identification (RFID) reader coupled to the plug, wherein the RFID reader receives signals from an RFID tag located on the pipeline. In one or more embodiments, the light source is coupled to the information handling system, and wherein the information handling system generates one or more commands to activate the light source. In one or more embodiments, the light source is a laser. In one or more embodiments, the system further comprises one or more sensors coupled to the plug, wherein the one or more sensors transmit one or more measurement signals to the receiver.

In one or more embodiments, a method comprises deploying a plug in a pipeline, wherein the plug is coupled to a fiber optic line, releasing the fiber optic line from a fiber optic dispenser as the plug is deployed within the pipeline, activating a light source, wherein the light source emits a light through the fiber optic line, receiving a signal from the plug via the fiber optic line, wherein the signal comprises light pulses indicative of the location of the plug and determining a location of the plug based, at least in part, on the received signal.

In one or more embodiments, the method further comprises receiving one or more measurement signals from the plug via the fiber optic line, wherein the one or more measurement signals are associated with one or more sensors coupled to the plug and adjusting one or more operational parameters based, at least in part, on the one or more measurement signals. In one or more embodiments, the fiber optic dispenser comprises at least one of a reel or a bobbin.

In one or more embodiments, the method further comprises detecting a change, by a radio frequency identification (RFID) reader, in a surrounding magnetic field in response to a traversed RFID tag and receiving an RFID signal from the RFID reader based on the detected change. In one or more embodiments, the method further comprises sending one or more commands to the plug. In one or more embodiments, herein the fiber optic line is released at a rate based, at least in part, on a threshold rate. In one or more embodiments, the method further comprises sending a notification that the plug is lodged in the pipeline based, at least in part, on the received signal.

In one or more embodiments, a system for deploying a plug within a pipeline comprises a plug coupled to a fiber optic line deployed within a pipeline, a fiber optic dispenser coupled to the fiber optic line, wherein the fiber optic dispenser dispenses the fiber optic line, a light source coupled to the fiber optic line, at least one processor and a memory including non-transitory executable instructions that, when executed, cause the at least on processor to activate the light source, wherein the light source emits a light through the fiber optic line, receive a signal from the plug via the fiber optic line, wherein the signal comprises light pulses indicative of the location of the plug and determine a location of the plug based, at least in part, on the received signal.

In one or more embodiments, the non-transitory executable instructions that, when executed, further cause the at least one processor to receive one or more measurement signals from the plug via the fiber optic line, wherein the one or more measurement signals are associated with one or more sensors coupled to the plug and adjust one or more operational parameters based, at least in part on the one or more measurement signals. In one or more embodiments, the non-transitory executable instructions that, when executed, further cause the at least one processor to display a notification that the plug is lodged within the pipeline based, at least in part, on the received signal. In one or more embodiments, the non-transitory executable instructions that, when executed, further cause the at least one processor to detect a change, by a radio frequency identification (RFID) reader, in a surrounding magnetic field in response to a traversed RFID tag and receive an RFID signal from the RFID reader based on the detected change. In one or more embodiments, the non-transitory executable instructions that, when executed, further cause the at least one processor to send one or more commands to the plug. In one or more embodiments, when the fiber optic line is released it is released at a rate based, at least in part, on a threshold rate.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

The foregoing description of certain aspects, including illustrated aspects, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a plug deployed within a pipeline;
   a fiber optic line coupled to the plug, wherein the fiber optic line is self-dissolvable;
   a light source coupled to the fiber optic line, wherein the light source provides a light for transmission through the fiber optic line;
   a receiver coupled to the fiber optic line;
   a magnetic pickup coil coupled to the plug, wherein the magnetic pickup coil detects a change in a surrounding magnetic field, and wherein the detected change induces a voltage in the magnetic pickup coil;
   a diode coupled to the magnetic pickup coil, wherein the magnetic pickup coil energizes the diode to generate a pulse of light as a signal to the fiber optic line based on the voltage;
   a fiber optic dispenser located at a surface and coupled to the fiber optic line, wherein the fiber optic dispenser dispenses the fiber optic line from an end of the fiber optic line, and wherein the fiber optic line is spooled from the fiber optic dispenser at the same rate as or greater than a flow of a fluid in the pipeline, and wherein the fiber optic dispenser is filled with a compressed gas to maintain dryness of the fiber optic line; and
   an information handling system communicatively coupled to the receiver, wherein the information handling system displays a location of the plug based, at least in part, on the signal.

2. The system of claim 1, wherein the diode is biased with energy from an energy source.

3. The system of claim 1, further comprising:
   at least one of a lower bobbin or a lower reel coupled to the plug, wherein the lower bobbin or the lower reel dispenses the fiber optic line spooled on the lower bobbin or the lower reel based on a tension of the fiber optic line to allow the plug to travel through the pipeline.

4. The system of claim 1, further comprising:
   a radio frequency identification (RFID) reader coupled to the plug, wherein the RFID reader receives signals from an RFID tag located on the pipeline.

5. The system of claim 1, wherein the light source is coupled to the information handling system, and wherein the information handling system generates one or more commands to activate the light source.

6. The system of claim 1, wherein the light source is a laser.

7. The system of claim 1, further comprising:
   one or more sensors coupled to the plug, wherein the one or more sensors transmit one or more measurement signals to the receiver.

8. A method comprising:
   deploying a plug in a pipeline, wherein the plug is coupled to a fiber optic line, and wherein the fiber optic line is self-dissolvable;
   releasing the fiber optic line from a fiber optic dispenser located at a surface as the plug is deployed within the pipeline, wherein the fiber optic line is spooled from the fiber optic dispenser at the same rate as or greater than a flow of a fluid in the pipeline, and wherein the fiber optic dispenser is filled with a compressed gas to maintain dryness of the fiber optic line;
   activating a light source, wherein the light source emits a light through the fiber optic line;

receiving a signal from the plug via the fiber optic line, wherein the signal comprises light pulses indicative of the location of the plug; and
determining a location of the plug based, at least in part, on the received signal.

9. The method of claim 8, further comprising:
receiving one or more measurement signals from the plug via the fiber optic line, wherein the one or more measurement signals are associated with one or more sensors coupled to the plug; and
adjusting one or more operational parameters based, at least in part, on the one or more measurement signals.

10. The method of claim 8, wherein the fiber optic dispenser comprises at least one of a reel or a bobbin.

11. The method of claim 8, further comprising:
detecting a change, by a radio frequency identification (RFID) reader, in a surrounding magnetic field in response to a traversed RFID tag; and
receiving an RFID signal from the RFID reader based on the detected change.

12. The method of claim 8, further comprising:
sending one or more commands to the plug.

13. The method of claim 8, wherein the fiber optic line is released at a rate based, at least in part, on a threshold rate.

14. The method of claim 8, further comprising:
sending a notification that the plug is lodged in the pipeline based, at least in part, on the received signal, wherein the received signal indicates that the plug has not traversed any other pipeline joints since receipt of a previous signal.

15. A system for deploying a plug within a pipeline, comprising:
a plug coupled to a fiber optic line deployed within a pipeline, wherein the fiber optic line is self-dissolvable;
a fiber optic dispenser located at a surface and coupled to the fiber optic line, wherein the fiber optic dispenser dispenses the fiber optic line, wherein the fiber optic line is spooled from the fiber optic dispenser at the same rate as or greater than a flow of a fluid in the pipeline, and wherein the fiber optic dispenser is filled with a compressed gas to maintain dryness of the fiber optic line;
a light source coupled to the fiber optic line;
at least one processor; and
a memory including non-transitory executable instructions that, when executed, cause the at least on processor to:
activate the light source, wherein the light source emits a light through the fiber optic line;
receive a signal from the plug via the fiber optic line, wherein the signal comprises light pulses indicative of the location of the plug; and
determine a location of the plug based, at least in part, on the received signal.

16. The system of claim 15, wherein the non-transitory executable instructions that, when executed, further cause the at least one processor to:
receive one or more measurement signals from the plug via the fiber optic line, wherein the one or more measurement signals are associated with one or more sensors coupled to the plug; and
adjust one or more operational parameters based, at least in part on the one or more measurement signals.

17. The system of claim 15, wherein the non-transitory executable instructions that, when executed, further cause the at least one processor to:
display a notification that the plug is lodged within the pipeline based, at least in part, on the received signal, wherein the received signal indicates that the plug has not traversed any other pipeline joints since receipt of a previous signal.

18. The system of claim 15, wherein the non-transitory executable instructions that, when executed, further cause the at least one processor to:
detect a change, by a radio frequency identification (RFID) reader, in a surrounding magnetic field in response to a traversed RFID tag; and
receive an RFID signal from the RFID reader based on the detected change.

19. The system of claim 15, wherein the non-transitory executable instructions that, when executed, further cause the at least one processor to:
send one or more commands to the plug.

20. The system of claim 15, wherein the fiber optic line is released at a rate based, at least in part, on a threshold rate.

* * * * *